(12) United States Patent
Chen et al.

(10) Patent No.: US 7,881,062 B2
(45) Date of Patent: Feb. 1, 2011

(54) EXTENSION BRACKET MODULE

(75) Inventors: Hsiao-Liang Chen, Kuei San Hsiang (TW); Kai-Kuei Wu, Kuei San Hsiang (TW)

(73) Assignee: Mitac International Corp., Taoyuan (TW)

( * ) Notice: Subject to any disclaimer, the term of this patent is extended or adjusted under 35 U.S.C. 154(b) by 875 days.

(21) Appl. No.: 11/775,049

(22) Filed: Jul. 9, 2007

(65) Prior Publication Data

US 2009/0016037 A1   Jan. 15, 2009

(51) Int. Cl.
*H05K 5/00* (2006.01)
*H05K 7/00* (2006.01)

(52) U.S. Cl. ............. 361/725; 361/679.32; 361/679.41; 361/727; 361/810

(58) Field of Classification Search ............ 361/679.32, 361/679.41, 725, 727, 810
See application file for complete search history.

(56) References Cited

U.S. PATENT DOCUMENTS

| 5,460,441 | A | * | 10/1995 | Hastings et al. ............. 312/298 |
| 5,506,750 | A | * | 4/1996 | Carteau et al. ......... 361/679.32 |
| 6,157,534 | A | * | 12/2000 | Gallagher et al. ........... 361/724 |
| 6,485,309 | B2 | * | 11/2002 | Edholm ....................... 439/61 |
| 7,349,204 | B2 | * | 3/2008 | Tanaka et al. .......... 361/679.33 |

* cited by examiner

*Primary Examiner*—Jayprakash N Gandhi
*Assistant Examiner*—Anthony M Haughton

(57) ABSTRACT

An extension bracket module is used for mounting an outer switch board of a computer system. The extension bracket module comprises a top plate and a panel perpendicular to each other. The top plate is levelly disposed and the outer switch board is configured facing downward and mounted onto a bottom surface of the top plate in parallel. An upper side of the panel is connected to a front edge of the top plate. Therefore, the deficit that the switch board in the prior art requires an extra longitudinal or transverse space of the computer system can be overcome through the design of the extension bracket module.

15 Claims, 5 Drawing Sheets

EXTENSION BRACKET MODULE

FIELD OF INVENTION

The present invention relates to an extension bracket module, and more particularly to an extension bracket module for mounting an outer switch board of a computer system.

BACKGROUND

A current computer system (or cluster system) comprises many main components and facilities, for example, motherboard, fan, power cord, and power supply, in which many electronic components such as IC component, socket, circuit board, microprocessor card and extension card can further installed on the mother board. However, accompanying the incessant elevation of the functions of the computer system, the facilities and the electronic components are also more and more relatively; they occupy overwhelming space in a housing of the computer system. How to fully utilize the limited space under the condition that the facilities and the electronic components are gradually increased and how to redistribute and plan the space to accept more electronic components in the limited space and giving consideration to the cooling of the electronic component are the current problems that must be faced.

Please refer to FIG. 1. FIG. 1 is a perspective view of a conventional computer system 1 in which many electronic components are disposed. A mother board 12 and a circuit board 13 are installed on the bottom of a housing 11 in a computer system 1 as the figure show, in which the mother board 12 and the circuit board 13 are connected to each other and a plurality of function cards 121 are installed on the upper side of the mother board 12 and a plurality of extension cards are installed on the upper side of the circuit board 13; the mother board 12 and the circuit board 13 are all faced upward to allow the extension card 131 and the function cards 121 to be faced downward to insert onto the motherboard 12 and the circuit board 13 and hence, the motherboard 12 and the circuit board 13 face upward and are connected side to side to each other such that not only more extension cards 131 and function cards 121 are unable to be accepted on the motherboard 12 and the circuit board 13 but also the circuit board 13 and the motherboard 12 also occupy the extra longitudinal or transverse space of the whole computer system 1. Besides, the assembly distributions of the motherboard 12 and the function cards 121 as well as the circuit board 13 and the extension cards 131 on the computer system are also unable to allow the heat generated when the function cards 121 and the extension cards 131 are in operation to be expelled in good measure owing to the limited space of the computer system 1, and when the extension card 121 or an internal electronic component is damaged, the housing 11 of the computer system 1 must be detached to allow the maintenance operation to be processed; this also causes a user to be inconvenient on the assembly. Moreover, using screws one by one to lock the extension cards 131 and the function cards 121 onto the housing 11 after the extension cards 131 and the function cards 121 are inserted in the circuit board 13 also causes the locking time to be wasted.

Thereupon, for designing a special mounting module for allowing more electronic components to be mounted thereon, satisfying cooling requirement of the electronic components and overcoming the deficits of the prior art mentioned above, the present invention is proposed.

SUMMARY

For improving the deficits mentioned above, the present invention provides an extension bracket module, thereby the distribution of the internal space of a computer system can be planned so as to save the space.

Therefore, the present invention provides an extension bracket module used for mounting an outer switch board of a computer system; the extension bracket module is constituted by a top plate and a panel. The top plate is horizontally disposed to allow the outer switch board to be faced downward to dispose in parallel onto the bottom of the top plate. The upper side of the panel is connected to the front edge of the top plate and the panel itself is perpendicular to the top plate.

The outer switch board in the extension bracket module according to the present invention is faced downward to allow the plurality of extension cards to be insert therein; the extension cards are disposed below the outer switch board. Furthermore, an inner switch board is faced upward to allow a plurality of circuit cards to be inserted therein; the circuit cards are then disposed above the inner switch board. Therefore, the extension cards and the circuit cards can be avoid being disposed at the same horizontal surface to cause them to collide together so that a greater deal of extension cards can be installed in the extension bracket module, and can overcome the deficit that only few extension cards can be installed on the circuit plate in the prior art relatively.

The design that the outer switch board of the extension bracket module of the present invention is faced downward can avoid the deficit that the circuit board of the prior art is faced upward to cause the extra space of the computer system in a longitudinal or transverse direction to be occupied unavoidably when the extension cards are assembled. Therefore, the internal space distribution of the computer system can be planned according to the present invention so as to attain to the space saving effect.

The extension bracket module of the present invention can be utilized to enable the internal space of the computer system to be planned and distributed thereby capable of making full use of the internal space to allow a fan corresponding to each electronic component to be added; the fan directly cool the electronic component so as to solve the problem that the space distribution in the prior art is unable to allow the enough cooling fans to be added to cool electronic components directly and effectively. Hence, the heat generated when the electronic component is in operation can be fully expelled to elevate the electronic component cooling efficiency according to the present invention.

When an electronic component in the computer system is to be replaced, only detaching the extension bracket module quickly and directly from the computer system to take out the electronic component is enough; this can avoid the deficit that the minute and complicate procedures of detaching the housing must be first processed and then to replace the electronic component in the prior art and process the assembly and the detaching of the electronic component more conveniently.

The present invention can solve the varieties of deficits that only few extension cards can be assembled, the longitudinal or transverse space of the whole computer system must be extraordinarily added and etc in the prior art so as to allow more extension cards to be assembled, save the space and elevate the electronic component cooling efficiency as well as be convenient for quickly fixing the extension card; the present invention is provided with high industrial applicability.

BRIEF DESCRIPTION OF THE DRAWINGS

The present invention can be more fully understood by reference to the following description and accompanying drawings, in which.

DETAILED DESCRIPTION

Figure 1:
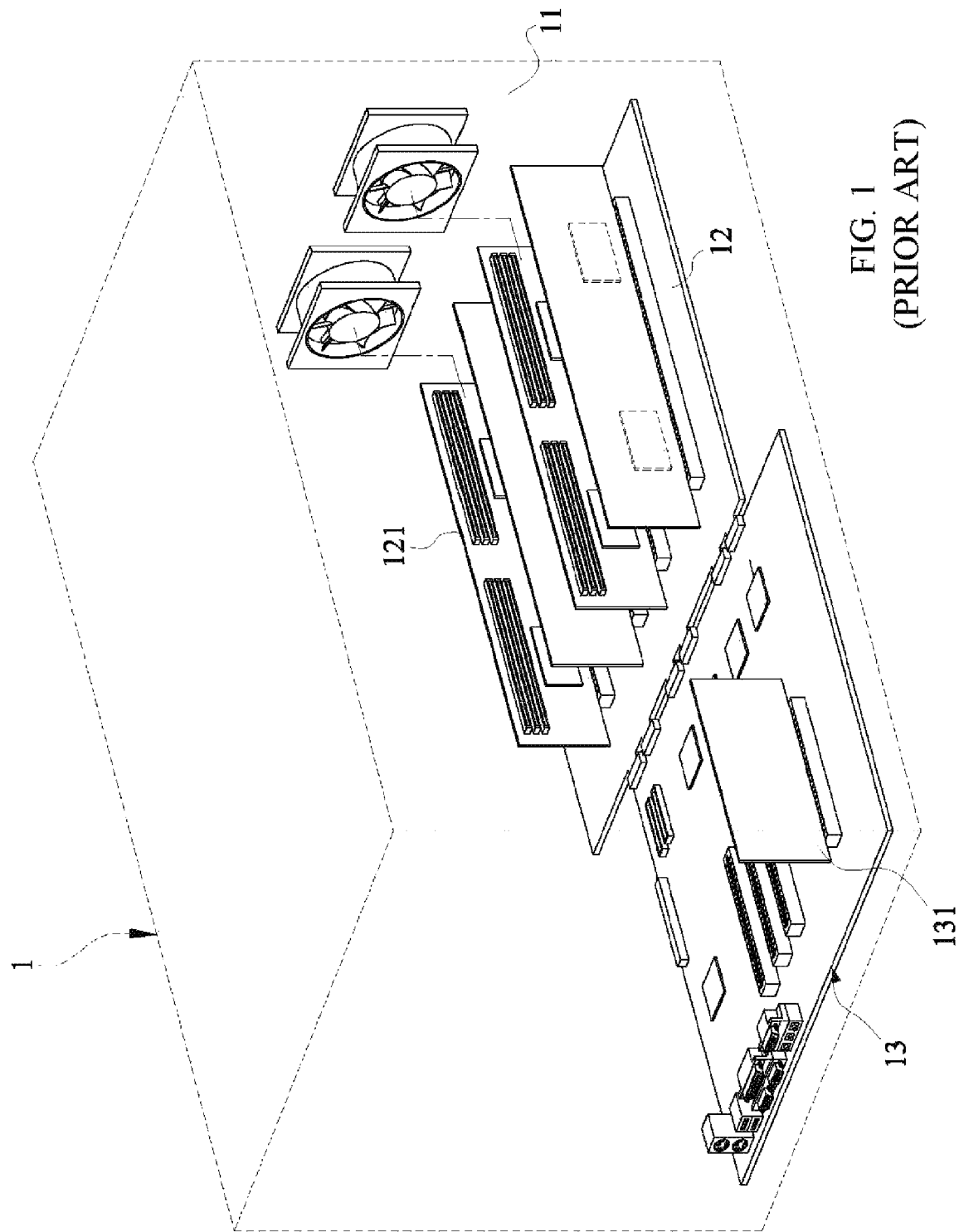
FIG. 1 is a perspective view of a conventional computer system in which electronic components are installed.
Figure 2A:
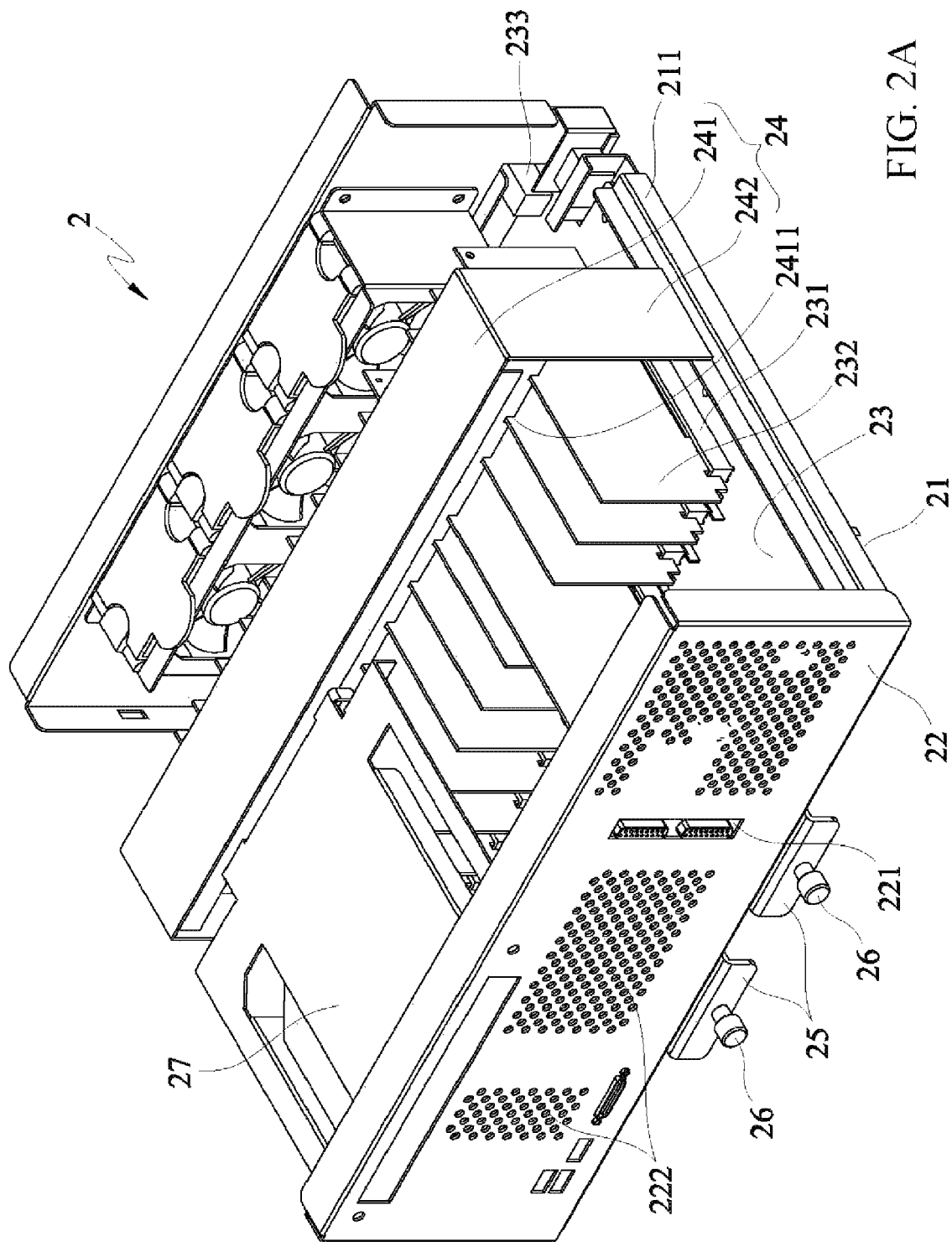
FIG. 2A is a perspective view of an extension bracket module according to the present invention.
Figure 2B:
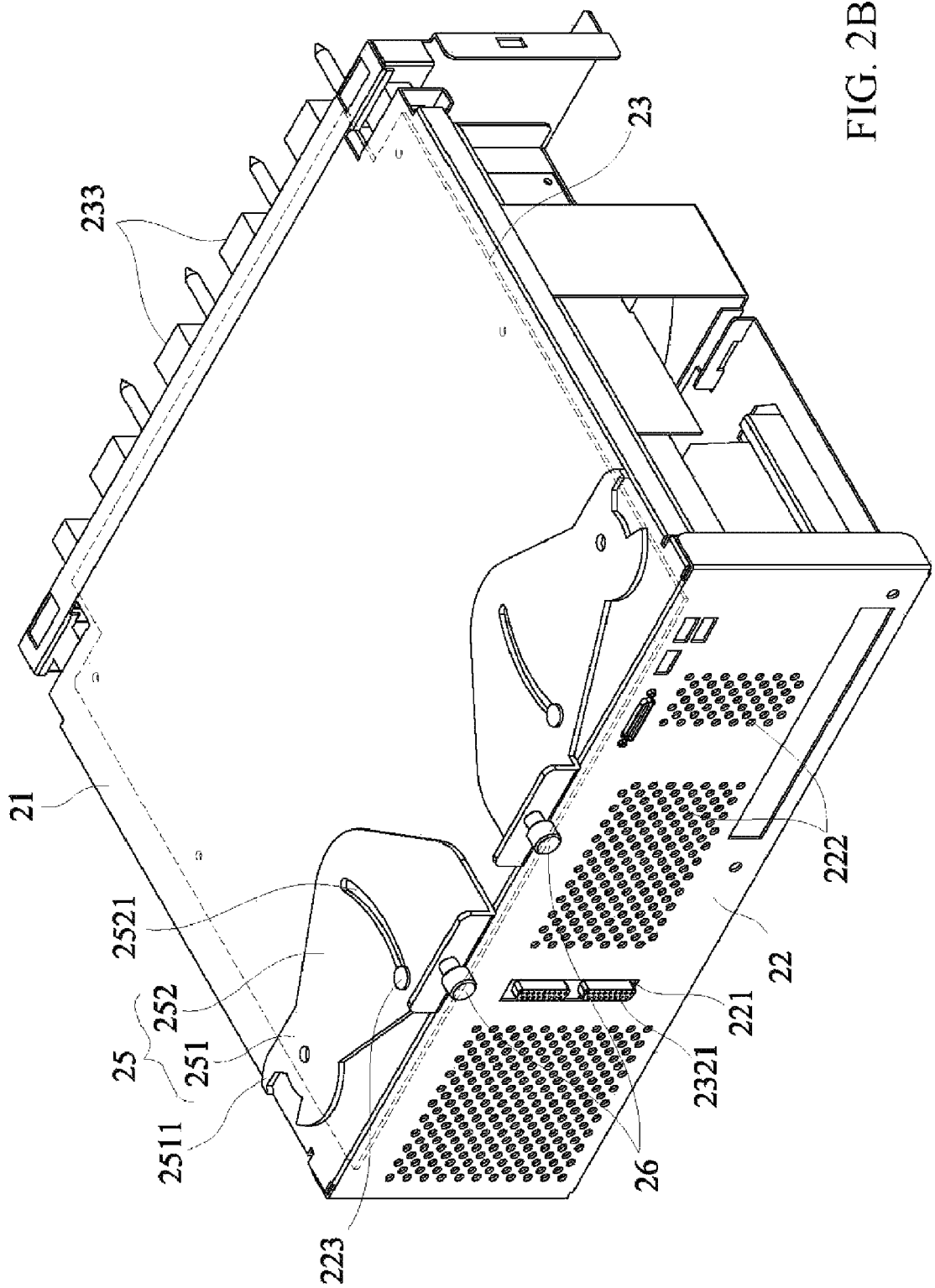
FIG. 2B is a perspective view of a back surface of an extension bracket module according to the present invention.
Figure 3:
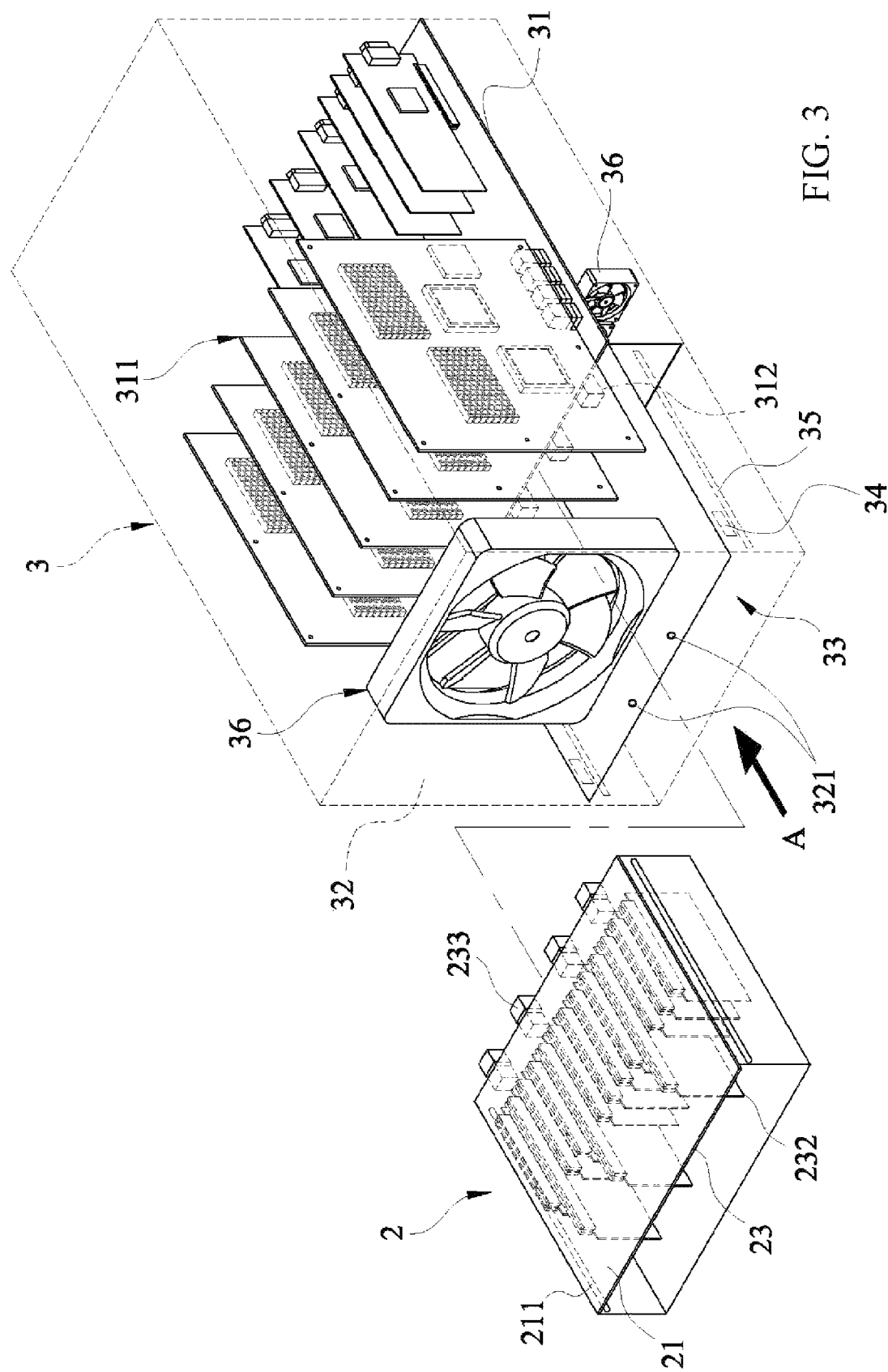
FIG. 3 is a perspective view of an extension bracket module and a computer system for allowing the extension bracket module to be assembled in according to the present invention.
Figure 4:
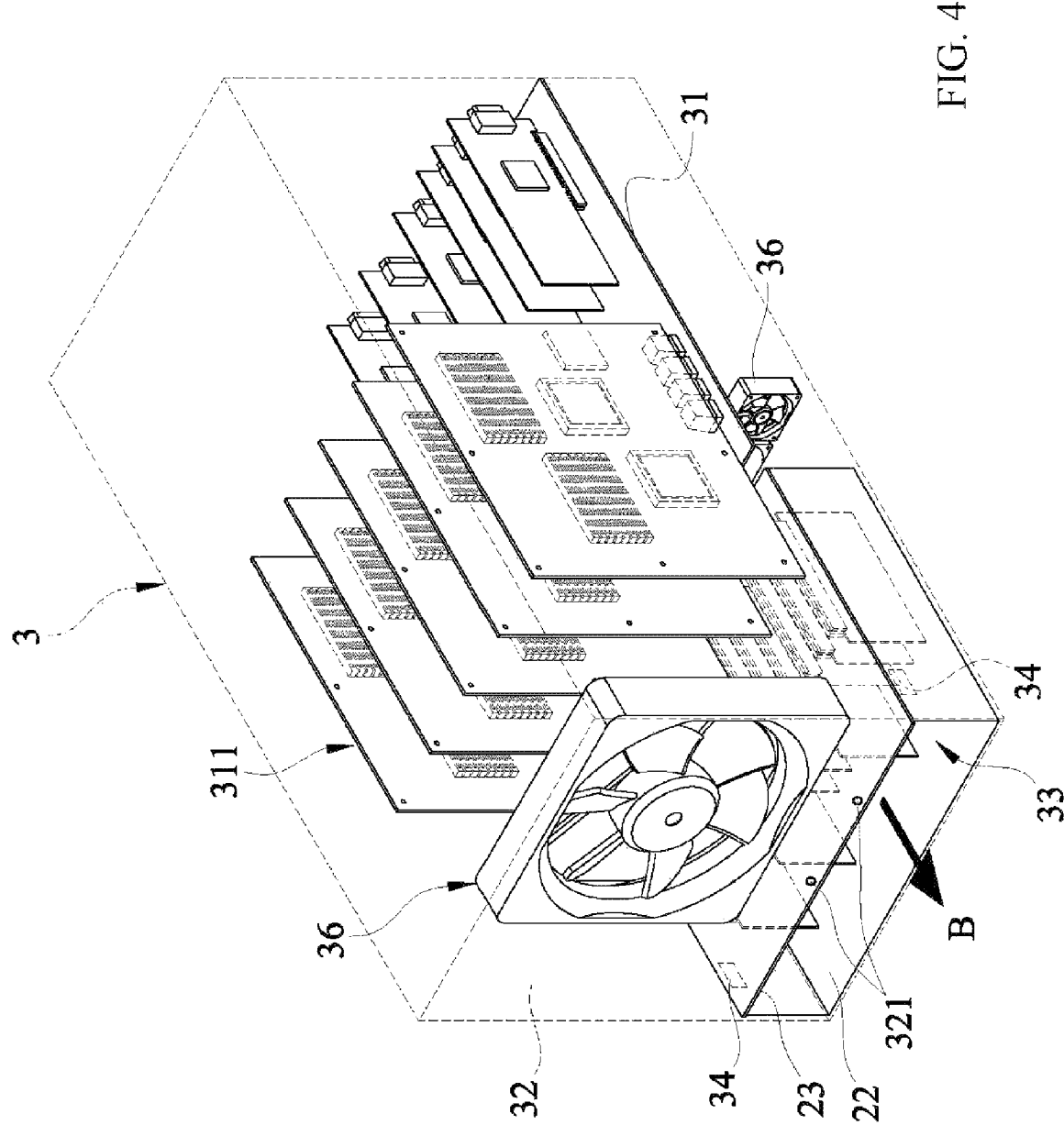
FIG. 4 is a perspective view of a computer system in which an extension bracket module is assembled according to the present invention.

Please refer to FIGS. 2A to 4. FIG. 2A is a perspective view of an extension bracket module according to the present invention. FIG. 2B is a perspective view of a back surface of an extension bracket module according to the present invention. FIG. 3 is a perspective view of an extension bracket module and a computer system for allowing the extension bracket module to be assembled in according to the present invention. FIG. 4 is a perspective view of a computer system in which an extension bracket module is assembled according to the present invention. An extension bracket module 2 used for mounting an outer switch board 23 of a computer system 3 is installed in an accepting space 33 of the computer system 3. The extension bracket module 2 is constituted by a top plate 21 and a panel 22.

The top plate 21 is levelly disposed to allow the outer switch board 23 to be faced downward to dispose in parallel onto the bottom surface of the top plate 21, and a plurality of slide rails are disposed on two sides of the top plate 21. Furthermore, a plurality of chutes 35 are disposed on two sides of the accepting space 33 of the computer system 3 to enable the top plate 21 to be slid on the chutes 35 through the slide rails 211.

The upper side of the panel 22 is connected to the front edge of the top plate, and the panel 22 itself is perpendicular to the top plate 21, in which the panel 22 comprises at least one opening 221 used for allowing a connection port 2321 to be passed through the opening 221 to expose out of the panel 22, and the panel 22 also comprises a plurality of meshes 222 used for air in the computer system to flow through to expel the heat generated when the extension card is in operation.

The outer switch board 23 and an inner switch board 31 of the computer system 3 are butted on each other side by side, the bottom surface of the outer switch board 23 allows the plurality of extension cards 232 to be assembled thereon and the upper side face of the inner switch board 31 allows a plurality of circuit boards 311 to be assembled thereon. Moreover, the front edge of the inner switch board 31 comprises a plurality of connection sockets 312 and the rear edge of the outer switch board 23 then comprises a plurality of connection heads 233 butted on the connection sockets 312. Because the outer switch board 23 is faced downward to allow the plurality of extension cards 232 to be inserted therein and the inner switch board 31 is faced upward to allow the plurality of circuit boards 311 to be inserted therein, the extension cards 232 and the circuit boards 311 can be prevented from colliding with each other on a position of the same level surface. Therefore, a larger amount of extension cards 232 can be assembled in the extension bracket module 2 and the extra longitudinal or transverse space can be relatively decreased so as to save the space.

The extension bracket module 2 of the present invention can further comprise a mounting seat 27 fixed on the panel 22 and used for mounting a driver.

The extension bracket module 2 of the present invention can further comprises a first positioning element 24 fixed on the top plate 21 and used for positioning the extension cards 232, and the first positioning element 24 comprises a propping board 241 and a fixing sheet 242. The propping board 241 is used for propping against the extension cards 232. The fixing sheets 242 are respectively positioned on two sides of the propping board 241; one end of each fixing sheet 242 is connected to one side of the propping board 241 and another end thereof is fixed on the top plate 21. A plurality of notches 2411 used for allowing the extension cards 232 to be inserted therein to fix are further disposed on the propping board 241, and because the first positioning element 24 is directly pressed down to fix the extension cards 232 at one time, the object of quickly fixing the extension cards 232 can be achieved.

The extension bracket module 2 of the present invention can further comprise at least one handle 25 positioned on the top plate 21 and used for assembling or detaching the top plate 21. The computer system 3 comprises at least one hook groove 34 positioned on at least one of two sides of the accepting space 33. The handle 25 comprises a pivot portion 251 and a swing arm 252; the pivot portion 251 is pivotally connected onto the top plate 21 and comprises a hook portion 2511 used for being engaged with the hook groove 34. The swing arm 252 takes the pivot portion 251 as a center to swing to cause the hook portion 2511 to be separated from the hook groove 34 so as to detach the top plate 21, in which the hook portion 2511 is a raised mass and the hook groove 34 is an indented groove.

The extension bracket module 2 of the present invention can further comprise a position limiting groove 2521 and a second positioning element 223; in which the position limiting groove 2521 is positioned on the swing arm 252, and the second positioning element 223 used for limiting the swinging scope of the swing arm is positioned on the top plate 21 and inserted in the positioning limiting groove 2521, in which the position limiting groove 2521 is circularly arched to allow the swing arm 252 to take the pivot portion 251 as a center to do a circular motion.

The extension bracket module 2 of the present invention can further comprise a grasping element 26 positioned on one end of the swing arm 252 and used for allow a user to grasp and exert a force to cause the swing arm 252 to swing, and the computer system 3 comprises a end face 32 positioned above the panel 22 and is parallel to the panel 22, the grasping element 26 can be used to lock the swing arm 252 on the end face 32, in which the grasping element 26 is a bolt. As it should be, the grasping element 26 is not limited to the one described in the present embodiment, it can also be an article such as retaining block, rib, tenon or any other equivalent structure capable of being used for locking the swing arm 252 on the end face 32.

But, it must be noticed that although a buckling design such as indented groove and raised mass is taken as an example to explain the realization technology of the hook groove 34 and the hook portion 2511 in the description mentioned above. However, it is easy to understand that the buckling of the hook portion 2511 and the hook groove 34 is only one example of the coupling structure, designs such as hook slip and retaining ring, raised mass and indented groove, flange and retaining groove all can achieve the same coupling effect. Therefore, the hook portion 2511 and the hook groove 34 of the present invention are absolutely not merely limited to the raised mass and the indented groove in the aforementioned embodiment.

When the extension bracket module 2 is to be assembled in the computer system 3 as FIG. 3 shows, a user first turns the extension bracket module 2 shown in FIG. 2A upside down to the back thereof in the direction as FIG. 2B shows, and then assembles the extension bracket module 2 along the direction shown by an arrow A to allow the slide rails 211 disposed on the extension bracket module to be slid on and along the chutes 35 in the computer system 3 to cause the extension bracket module 2 to be slid into the accepting space 33 of the computer system 3 and in the meantime, the handle 25 is accepted in the accepting space 33. Thereafter, the user rotates the grasping element 26 disposed on the handle 25 to cause it to be passed through circular holes 321 disposed on the end face 32 of the computer system 3 so as to lock the handle 25 on the end surface 32 of the computer system 3. At this time, the hook portion 2511 disposed on the pivot portion 251 of the handle 25 is then automatically hooked in the hook groove 34 on the two sides of the accepting space 33 of the computer system 3 so as to complete the assembly and fix the extension bracket module 2 to prevent the extension bracket module 2 from being loosed owing to the shaking of the computer system 3. Whereby, the internal space of the computer system 3 can be fully used to allow fans corresponding to the extension cards 232 to be added to directly process the cooling on the extension cards 232 or the electronic components around them so as to elevate the extension card 232 and the electronic component cooling efficiency.

Please refer to FIG. 2B again. When the extension bracket module 2 is to be detached as FIG. 4 shows, a user grasps the grasping element 26 disposed on the handle 25 and rotates the grasping element 26 to allow the grasping element 26 to be separated from the circular hole 321 disposed on the end face 32 of the computer system 3. Thereafter, the user takes the pivot portion 251 as an axle center to rotate the swing arm 252 of the handle 25 in the accepting space 33 to release a part of swing arm 252 and in the meantime, the hook portion 2511 disposed on the pivot portion 251 of the handle is then automatically separated from the hook grooves 34 on the two sides of the accepting space 33 of the computer system 3. Next, the user then detaches the extension bracket module 2 along a direction shown by an arrow B. Whereby, the assembly and the detaching of the extension cards 232 can be conveniently processed.

Conclusively, the extension bracket module of the present invention can be used to attain to the effects of assembling a larger amount of extension bracket cards, saving space and elevating electronic element cooling efficiency, and being convenient for processing the fast fixing on the extension cards, and solve a variety of deficits; the present invention is provided with high industrial applicability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:
    an inner switch board, wherein an upper face of the inner switch board is configured to allow a plurality of circuit boards to be assembled thereon;
    an outer switch board, wherein a bottom face of the outer switch board is configured to allow a plurality of extension cards to be assembled thereon;
    an extension bracket module configured to be removably received in an accepting space of the computer system, comprising:
        a top plate, wherein the outer switch board is installed on a bottom surface of the top plate, and wherein the top plate is disposed levelly such that the bottom face of the outer switch board faces downward and is parallel to the bottom surface; and
        a panel, perpendicular to the top plate, having an upper side connected to a front edge of the top plate;
    wherein the accepting space and the inner switch board are arranged such that an edge-to-edge butt connection is formed between the outer switch board and the inner switch board when the extension bracket module is received in the accepting space.

2. The computer system of claim 1, wherein a front edge of the inner switch board comprises a plurality of connection sockets, a rear edge of the outer switch board comprises a plurality of connection heads, and butt connections are formed between the connection heads and the connection sockets.

3. The computer system of claim 1, wherein the panel comprises at least one opening arranged to allow a connection port to be passed therethrough.

4. The computer system of claim 1, wherein the panel comprises a plurality of meshes arranged to allow air in the computer system to flow through to expel heat generated when the extension cards are in operation.

5. The computer system of claim 1, further comprising a plurality of sliding rails respectively disposed on two sides of the top plate and arranged to allow the top plate to be slid in the computer system.

6. The computer system of claim 1, further comprising a first positioning element fixed on the top plate and configured to position the extension cards.

7. The computer system of claim 6, wherein the first positioning element comprises:
    a propping board, arranged to prop against the extension cards; and
    two fixing sheets, respectively disposed on two sides of the propping board, wherein one end of the fixing sheet is connected to one side of the propping board and another end thereof is fixed on the top plate.

8. The computer system of claim 7, further comprising a plurality of grooves disposed on the propping board and configured to receive and fix extension cards inserted therein.

9. The computer system of claim 1, further comprising a mounting seat used for mounting a driver.

10. The computer system of claim 1, further comprising at least one handle positioned on the top plate and arranged to allow assembling or detaching the top plate.

11. The computer system of claim 10, wherein the computer system further comprises at least one hook groove positioned on two sides of the computer system, the handle comprises:
    a pivot portion, pivotally connected onto the top plate and comprises a hook portion for hooking in the hook groove; and a swing arm, pivoting on the pivot portion and swinging to separate the hook portion from the hook groove.

12. The computer system of claim 11, further comprising a limiting groove and a second positioning element, the limiting groove being positioned on the swing arm, the second positioning element being positioned on the top plate and being inserted in the limiting groove and limiting the swinging scope of the swing arm.

13. The computer system of claim 12, wherein the limiting groove is circularly arched.

14. The computer system of claim 11, further comprising at least one grasping element positioned on one end of the swing arm and arranged to allow a user to grasp and exert a force to cause the swing arm to be swung.

15. The computer system of claim 14, wherein the computer system further comprises an end face, positioned on the panel and corresponding in parallel to the panel, wherein the grasping element locks the swing arm onto the end face.

* * * * *